United States Patent
Hill et al.

(10) Patent No.: US 10,012,814 B2
(45) Date of Patent: Jul. 3, 2018

(54) OPTICAL FIBER MANAGEMENT

(71) Applicant: Clearfield, Inc., Brooklyn Park, MN (US)

(72) Inventors: John P. Hill, Andover, MN (US); Randy T. VanHorn, Princeton, MN (US); Joshua J. Povlitzki, Otsego, MN (US); Walter E. Power, II, Jordan, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 14/870,691

(22) Filed: Sep. 30, 2015

(65) Prior Publication Data

US 2016/0097907 A1 Apr. 7, 2016

Related U.S. Application Data

(60) Provisional application No. 62/058,364, filed on Oct. 1, 2014.

(51) Int. Cl.
*G02B 6/44* (2006.01)
*G02B 6/38* (2006.01)

(52) U.S. Cl.
CPC ......... *G02B 6/4455* (2013.01); *G02B 6/4442* (2013.01); *G02B 6/4476* (2013.01); *G02B 6/3897* (2013.01); *G02B 6/448* (2013.01); *G02B 6/4452* (2013.01); *G02B 6/4471* (2013.01); *G02B 6/4478* (2013.01)

(58) Field of Classification Search
None
See application file for complete search history.

(56) References Cited

U.S. PATENT DOCUMENTS

| 7,400,813 | B2 * | 7/2008 | Zimmel | G02B 6/4455 385/135 |
| 7,493,002 | B2 * | 2/2009 | Coburn | G02B 6/3897 379/325 |
| 8,059,932 | B2 * | 11/2011 | Hill | G02B 6/4454 385/135 |
| 8,712,206 | B2 * | 4/2014 | Cooke | G02B 6/4452 385/134 |
| 8,855,456 | B2 * | 10/2014 | Beamon | G02B 6/3897 385/135 |

(Continued)

FOREIGN PATENT DOCUMENTS

| FR | 2917184 A1 | 12/2008 |
| WO | 1996019745 | 6/1996 |

OTHER PUBLICATIONS

International Search Report and Written Opinion for related PCT Application No. PCT/US2015/053384, dated Jan. 14, 2016, 13 pages.

(Continued)

*Primary Examiner* — Tina Wong
(74) *Attorney, Agent, or Firm* — Pepper Hamilton LLP (57) ABSTRACT

The present disclosure includes devices and systems for optical fiber management. One embodiment includes a device comprising an integrated separation surface separating an upper level of storage and a lower level of storage and an integrated adapter plate comprising a number of optical connectors and arranged at a first angle with respect to a floor of the device.

7 Claims, 12 Drawing Sheets

(56) References Cited

U.S. PATENT DOCUMENTS

| | | | |
|---|---|---|---|
| 8,958,679 B2* | 2/2015 | Kramer | G02B 6/3825 |
| | | | 385/135 |
| 9,753,229 B2* | 9/2017 | Murray | G02B 6/3608 |
| 2005/0100302 A1 | 5/2005 | Schray | |
| 2010/0142910 A1 | 6/2010 | Hill et al. | |
| 2010/0290753 A1 | 11/2010 | Tang et al. | |
| 2013/0089292 A1 | 4/2013 | Ott et al. | |
| 2013/0240124 A1 | 9/2013 | Wakjira et al. | |
| 2015/0093089 A1* | 4/2015 | Varghese | G02B 6/4455 |
| | | | 385/135 |

OTHER PUBLICATIONS

Partial European Search Report, dated Mar. 5, 2018, from corresponding European Application No. 15846738.1.

* cited by examiner

OPTICAL FIBER MANAGEMENT

CROSS REFERENCE TO RELATED APPLICATION

The present application claims priority to U.S. Provisional Application No. 62/058,364, filed on Oct. 1, 2014, the disclosure of which is incorporated in its entirety herein by reference.

BACKGROUND

An optical fiber (e.g., glass, plastic) carries light along its length. Light is kept in the core of the optical fiber by internal reflection. The optical fiber acts as a waveguide. Optical fiber can be used as a communication medium for telecommunication and networking applications because it is flexible and can be bundled into cables. Although referred to as "optical fiber," optical fiber is not restricted to communicating light in the visible spectrum, and may transmit light signals of higher, or lower, wavelengths.

Optical fiber is especially advantageous for communications because light propagates through the fiber with less attenuation than for electrical signals using metal wires. This facilitates long distance communications using few repeaters. Unlike electrical communication modes, light signals are immune to electromagnetic interference, thereby eliminating cross-talk between signals and the effects of environmental noise. Non-armored optical fiber cables do not conduct electricity, which makes optical fiber a good solution for protecting communications equipment located in electrically-exposed environments, including communication structures prone to lightning strikes.

Optical fiber permits transmission at higher bandwidths (e.g., data rates) than other forms of communications. Per-channel light signals propagating in the fiber can be modulated at rates in the range of gigabits per second. An individual optical fiber can carry many independent channels, each using a different wavelength of light and wavelength-division multiplexing (WDM). Optical fiber saves space in cable ducts because a single optical fiber can carry much more data than a single electrical cable.

A fiber optic cable is usually made up of many individual optical fibers. For example, according to one commercially available configuration, twelve (12) 250 micron optical fibers may be grouped together in a buffer tube. A fiber optic cable may contain 6 buffer tubes (i.e., for a total of 72 optical fibers) and one or more strength members (e.g., metallic member), with the buffer tubes and strength member being surrounded by a jacket providing physical and environmental protection. Other commercially available fiber optic cable configurations may include 144 optical fibers (e.g., 12 buffer tubes of 12 optical fibers each), or 288 optical fibers (e.g., 12 buffer tubes of 24 optical fibers each), and ribbon fibers, among others.

Individual optical fibers (e.g., glass, plastic) can be fragile, and require measures to prevent fracturing, or breakage. Optical fiber can be subject to physical routes limited to a minimum bend radius, at the cable level and/or at an individual fiber level, to prevent fracturing, breakage, or signal distortions/losses. In addition, optical fibers may be damaged if they are subjected to excessive tension or physical impact. Due to the risk of damage, it is preferable to avoid handling individual fibers any more than is necessary.

Optical fibers are increasingly being used to provide signal transmission between various service providers (e.g., telephone systems, video systems, computer network, etc.) and individual users (e.g., homes, businesses). Fibers which support many propagation paths or transverse modes are called multi-mode fibers (MMF), while those which can only support a single mode are called single-mode fibers (SMF). MMF generally has a larger core diameter, and is used for short-distance communication links, and SMF is used for longer distance communication links. Working with optical fiber (e.g., splicing, splitting, patching) involves close tolerances, and is best accomplished in controlled environments where physical alignments, temperature, and cleanliness are better managed to facilitate precision work results.

DETAILED DESCRIPTION

Optical fiber management apparatuses, such as outside plant (OSP) distribution cabinets, distribution frames, patch panels, and splice terminations are used wherever the interconnection or cross-connection of multiple optical fibers is required. For example, optical fiber cable comprising numerous individual fibers may enter a distribution cabinet, fiber frame, or patch panel for connection to the individual optical fibers that split off to provide service to homes or businesses. Often, it is desirable that such optical fiber management, and/or optical fiber connection apparatus, allow for the interconnection of a large number of individual fibers in as small a space as possible (e.g., high density connections).

It may be desirable to make the work of technicians installing and servicing the optical fiber connection apparatuses and associated optical fibers as simple as possible. Previous patch panel approaches mimicked electrical termination cabinets. Traditional central office fiber management uses a fixed bulkhead design and costly radius and physical fiber protection inside an overall housing. While these apparatus provide some protection to the connectors and fibers, the fibers may then typically be routed only through the top and bottom of the unit or only through slots in the side of the unit. Density is therefore sacrificed to gain protection of the connectors and fibers.

Previous optical fiber management approaches include the use of above-grade outdoor fiber management cabinets. These cabinets may be large, heavy, and non-portable cabinets used to protect optical fibers. Some cabinets may be below-grade, but these cabinets are also large, heavy, and non-portable, and are much more expensive than their above-grade counterparts.

In contrast, examples of the present disclosure include an optical fiber management device, or "cassette" (hereinafter "cassette") and/or an optical fiber management cabinet with reduced footprints. For instance, an optical fiber management cassette in accordance with the present disclosure can include a cassette that allows for maintenance of a particular fiber bend radius, while maintaining a compact size.

An optical fiber management cabinet in accordance with the present disclosure can include a cabinet that is compact in size and can be installed above-grade or below grade. An optical fiber management cabinet in accordance with the present disclosure may be portable, such that the entire cabinet can be transported in the field to a location for maintenance and repairs, for instance.

Examples of the present disclosure can also include a ribbonizing tool for ribbonizing optical fiber and a splitter for splitting optical fiber. In some examples, the ribbonizing tool may be attached to the cassette during a shipping process, for instance.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. In addition, the proportion and the relative scale of the elements provided in the figures are intended to illustrate the embodiments of the present disclosure, and should not be taken in a limiting sense. The last two digits of reference numbers correspond to an item, with preceding digits corresponding to the drawing number. For example, one embodiment of the present disclosure is indicated by the reference number 406 with respect to FIG. 4, and a similar embodiment is indicated by the reference number 506 with respect to FIG. 5.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of components can refer to one or more components.

Figure 1A:
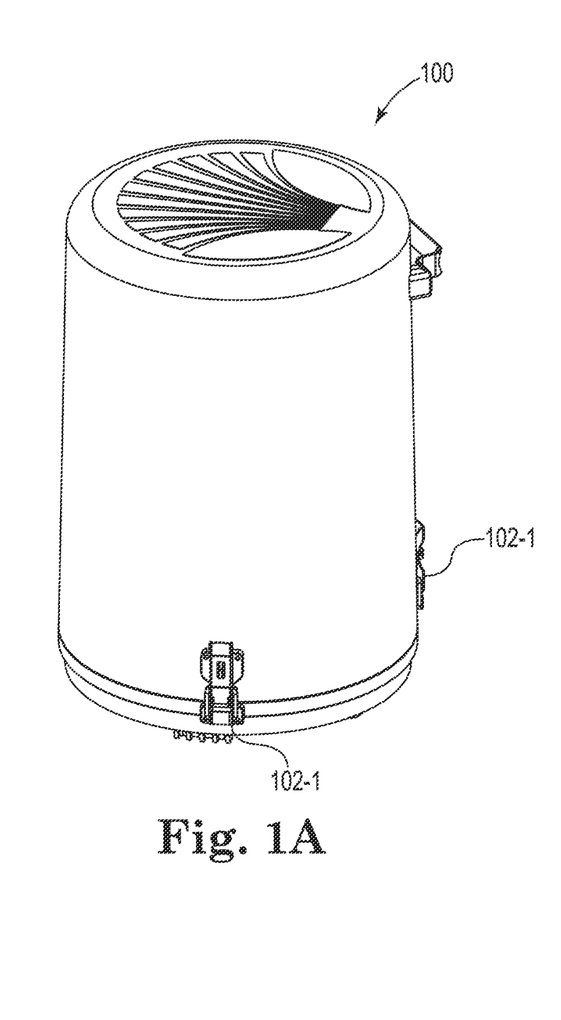
FIGS. 1A and 1B are views of a fiber management cabinet in accordance with one or more embodiments of the present disclosure.
Figure 1B:
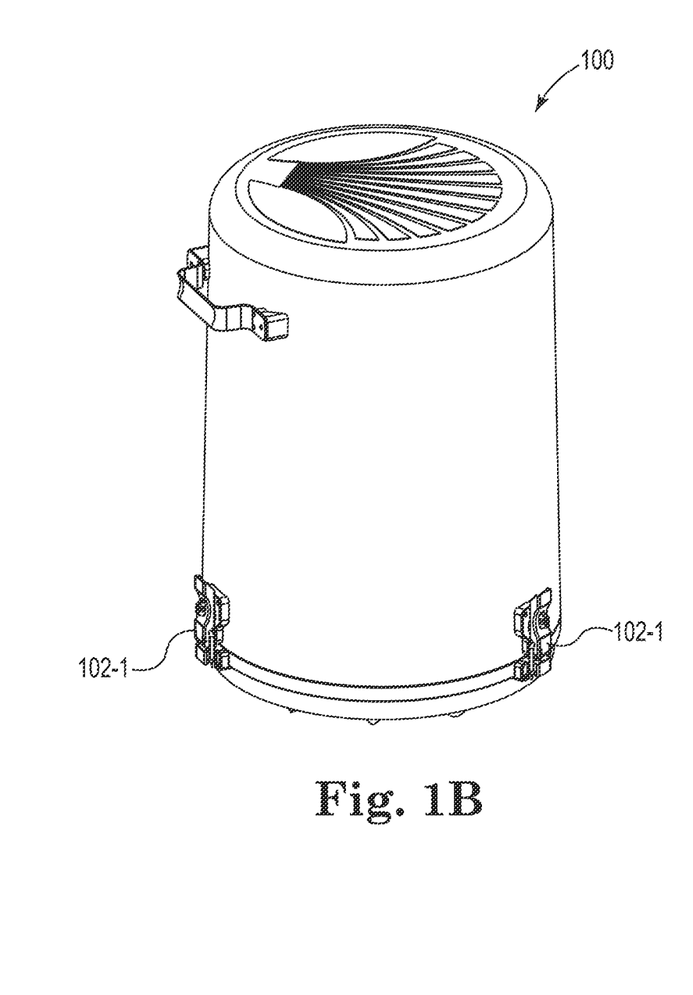

FIGS. 1A and 1B are views of a fiber management cabinet 100 in accordance with one or more embodiments of the present disclosure. FIGS. 1A and 1B illustrate the exterior of cabinet 100. Fiber management cabinet 100 may have a smaller footprint, a lower space requirement, be lighter weight, and be a lower cost alternative to previous metal enclosure cabinets. For instance, cabinet 100 may have a footprint capable of fitting in a 17 inch×30 inch vault. Cabinet 100 may be designed for below grade (weatherproof) applications, but may also be suitable for standard above ground installation, as well as being pole mounted. In some examples, cabinet 100 may be installed in an area including a boulevard or an area between a curb and a sidewalk in an urban environment with these physical features or an area equal to the same in a less dense or more rural environment. In such an area, a broadband network can be built without requiring permission from property owners other than the utility or municipality for buried plant or pole line access. In some examples, cabinet 100 may be accessed on a regular basis, and may be located in a handhole or vault that fits into this application area (e.g., 17 inch×30 inch vault).

The assembly process for an empty (no cassettes or splitters) cabinet 100 may be tool-less, which may allow for a de-skilled and rapid assembly in a factory, in the field, or at a distribution location, among others. Cassettes and splitters, as will be discussed further herein, may be pre-configured and terminated at a location different or the same as cabinet 100. These finished assemblies can be loaded into the product during the assembly of cabinet 100 or shipped as separate items to customers and distributors, among others.

Cabinet 100 may be composed of, for example, weatherproof material. Cabinet 100 may accommodate, for instance, a number of ports. In one example, cabinet 100 can accommodate 288 distribution ports (SC) and 24 feeder ports (capacity of 26 cassettes total). The number of ports is not limited to these examples, however. More or less ports may be accommodated by cabinet 100.

Cabinet 100 can allow for easy entry and closure for service needs and updates. For instance, cabinet 100 can include latch or "snap and lock" closures, for instance, as illustrated by closures 102-1. In some instances, cabinet 100 can include a claw/latch set closure 202-2, as illustrated in FIG. 2F. Cabinet 100 can allow for an ability to easily remove cassettes and/or gain access to cassettes for splicing, and troubleshooting, among others.

Figure 2A:
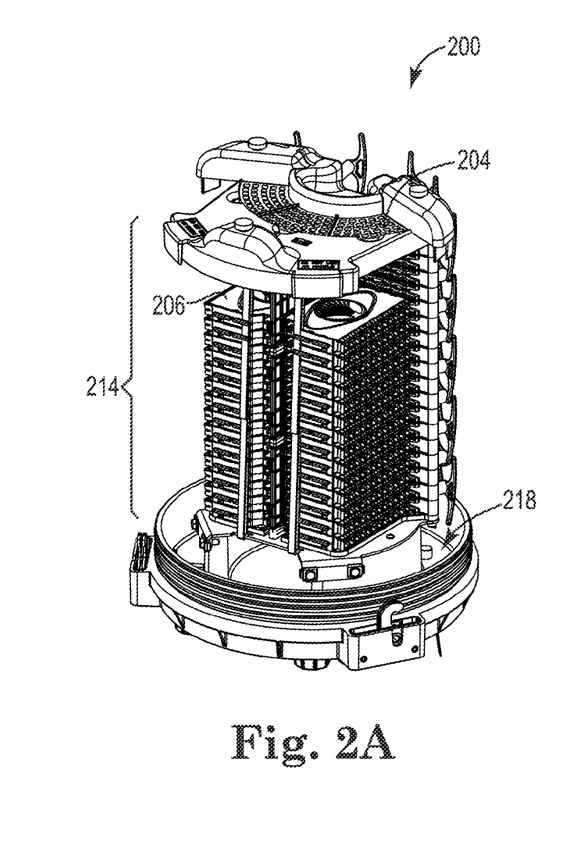
FIGS. 2A-2F are views of components within a fiber management cabinet in accordance with one or more embodiments of the present disclosure.
Figure 2B:
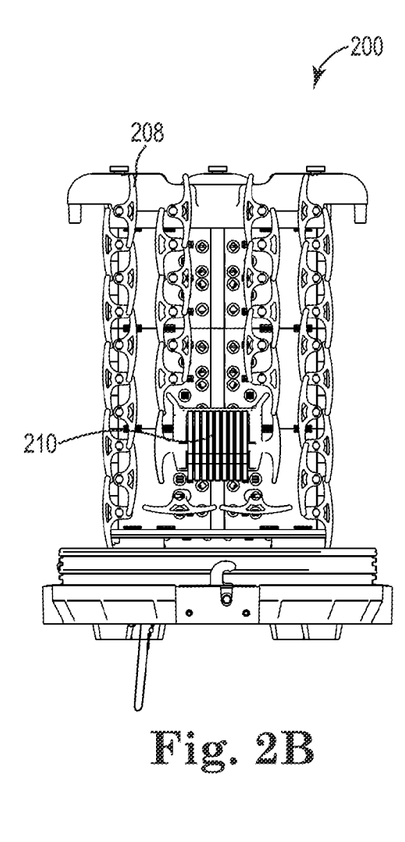
Figure 2C:
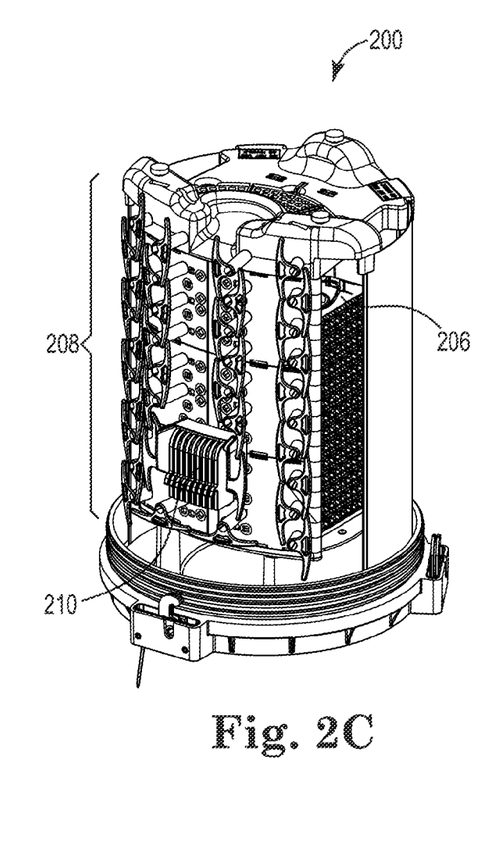
Figure 2D:
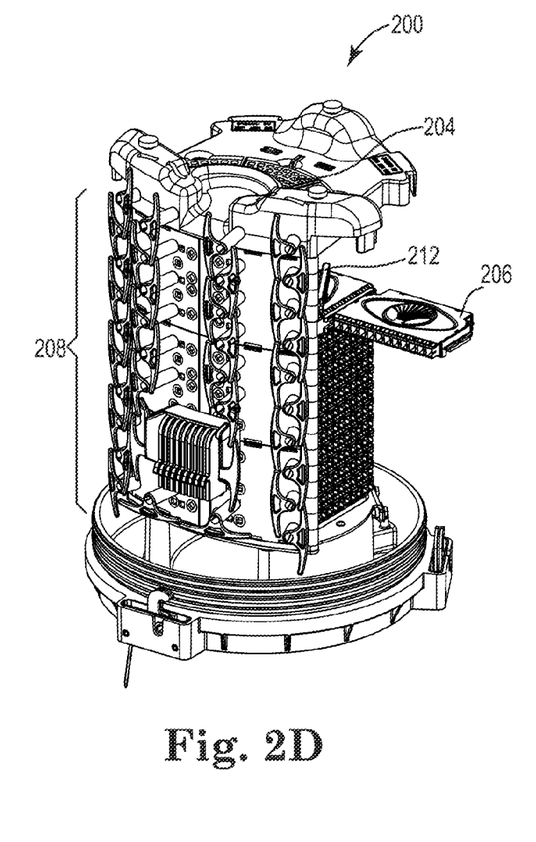
Figure 2E:
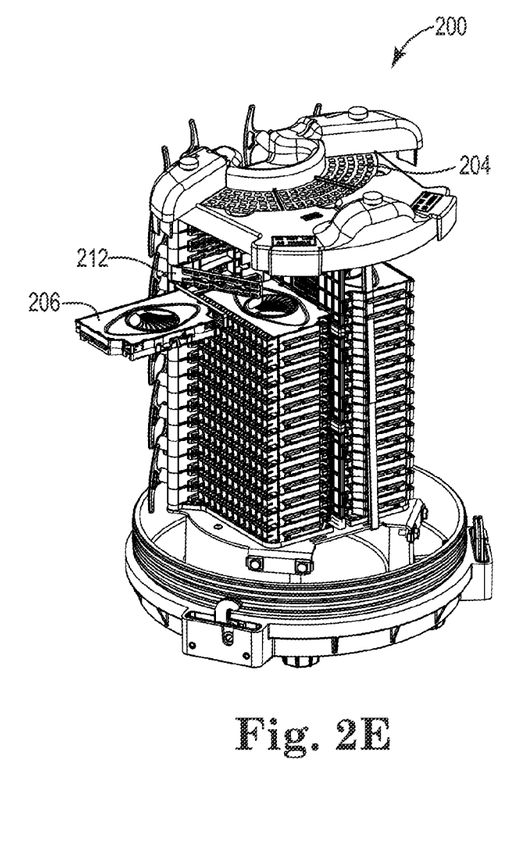
Figure 2F:
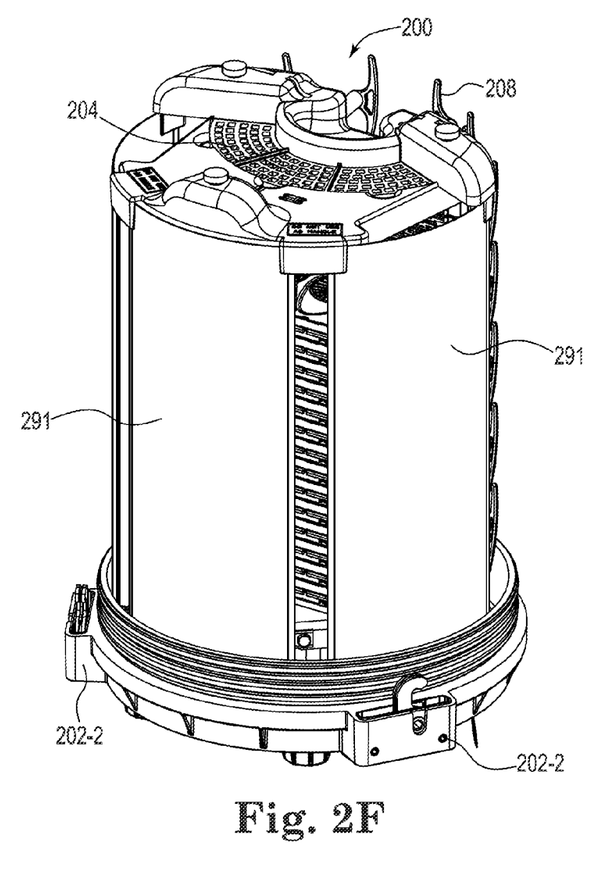

FIGS. 2A-2F are views of components within a fiber management cabinet 200 in accordance with one or more embodiments of the present disclosure. FIGS. 2A-2F illustrate different views of the inside of spherical cabinet 200. For example FIG. 2A may be a "front perspective" view of cabinet 200, while FIG. 2B is a "back" view. However, as the cabinet 200 is spherical, views should not be limited to "front", "back", etc. For ease of reference, FIGS. 2A-2F will be discussed together. Cabinet 200 can include jacketed fiber slack storage space, also known as a base 218, to accommodate slack storage of jacketed fiber (e.g., buffer tube, ribbon cable, etc.). For instance, cabinet 200 may accommodate 20 feet of slack when fully loaded with feeder and distribution. Cabinet 200 may also be available in patch-only and patch-and-splice configurations. As will be discussed further herein, cabinet 200 can include a built-in splitter 210 (e.g., splitter cage/housing).

Cabinet 200 can allow for easier removal of the cabinet and components and/or access to the cabinet and components as compared to other approaches. For instance, a cassette 206 can be part of the assembly being placed onto swing-out arm 212 that locks into position when deployed, and swings out when access is required, allowing for hands-free work practice. Cassette 206 may be removable off of this feature when it is desired to remove the entire cassette 206 completely from the unit. Cassette 206 can slide onto a rail on arm 212 and can lock into arm 212 and into cabinet 200 and/or can comprise tabs (illustrated in FIG. 4A) configured to be received by arm 212 to stabilize the cassette. For example, cassette 206 may lock into place in multiple locations (e.g., into the arm 212 and into cabinet 200) to prevent sag and other issues when used in combination with swing-out arm 212.

The swing-out arm 212 may have a locking feature in the deployed position. This can work alongside a cassette's locking feature to provide a three-point locking feature to prevent sag- and vibration-related conditions that may cause the swing arm and cassette to become disengaged.

Cabinet 200 may be portable, such that it can be easily moved to a different location, for instance, a splice truck. Additionally, bulkheads internal to cabinet 200 can include a "mirror" symmetrical two-sided design allowing for placement into the round enclosure that is cabinet 200. Cabinet 200 can include input ports (e.g., six input ports), allowing for route diversity of cables. Cabinet 200 can also accommodate a smaller cassette allowing ribbon splicing and opposite end feeds for tube diameter routing. A cassette 206 of particular size, as will be discussed further herein, can be used within cabinet 200. The cassette 206 can support different media (e.g., ribbon and/or loose tube).

A splitter 210 to support different tubing sizes (e.g., 1×4, 1×8, 1×16, 1×32 and multiples thereof) can fit within the reduce spaced of cabinet 200, as will be discussed further herein. In order to do this, a smaller footprint is required. The cassette module 214 may be of a snap-and-lock design where a particular number (e.g., nine) of these components will nest into a splitter cradle on the bulkhead of cabinet 200. Media may be a particular size (e.g., as large as 2 mm and as small as 900 um) for reduction of cable pile-up throughout the route path without increased risk of damage to splitter legs.

A radius limiter 208 with "retention arms" (e.g., overlapping retention arms) may be located through the entire route path (splitter 210 to parking lot 204 and splitter 210 to distribution (subscriber port)) to eliminate the possibility of jumpers "fall off" due to orientation of the cabinet 200 in a stored position. Unlike prior cabinets where vertical orientation is mandatory due to mounting methods, cabinet 200 can be placed vertically or horizontally dependent on a size of vault it is placed in, for example. Additionally, cabinet 200 may portable, allowing technicians to transport the entire unit from a vault, above grade, or pole, to a tent or splice trailer for servicing/installation. The radius limiter 208 with retention arms may ensure the route path is maintained during these events.

Radius limiter 208 (referring to both the individual and the group) can secure routed fibers into place regardless of the cabinet orientation in a stored position or during transport and handling, and a rod (e.g., of the radius limiter 208) that fibers lay over can have a radius that meets a particular bend radius requirement for the media planned to route over it. The radius rod may have capture tabs or ears to prevent fibers from sliding off of them. These capture tabs or ears may be long enough to assist same fiber capture for radius rods directly adjacent (e.g., above and/or below). Minimal clearance between rods and tabs (ears) may allow a user to route jumpers during subscriber turn-up of splitter leg to subscriber port and subsequent slack storage through the route path.

As noted above, cabinet 200 can also include a parking lot 204 for optical fibers. In some instances, parking lot 204 may be disposable. Parking lot 204 may store unused optical fiber and/or splitter legs. For instance, parking lot 204 may include clips, foam block, and/or dead adapters to hold connectors) until they are later used.

Cabinet 200 can include panels 291 that may protect components of the cabinet. In some instances, panels 291 may slide or clip into place. Panels 291 may be removable or may be integrated. Components within cabinet 200 may be arranged in varying heights depending on demand on the system. For instance, components can be stacked higher when more cassettes are desired and/or when more optical fiber is desired.

Figure 3A:
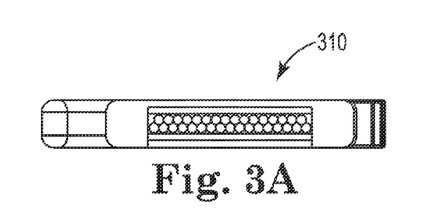
FIGS. 3A-3D are views of a splitter in accordance with one or more embodiments of the present disclosure.
Figure 3B:
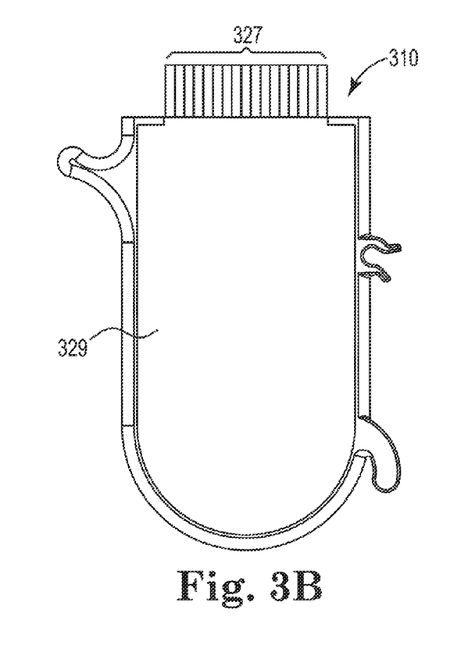
Figure 3C:
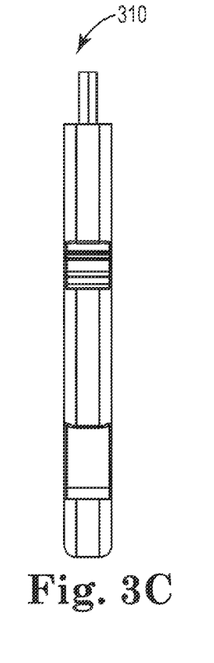
Figure 3D:
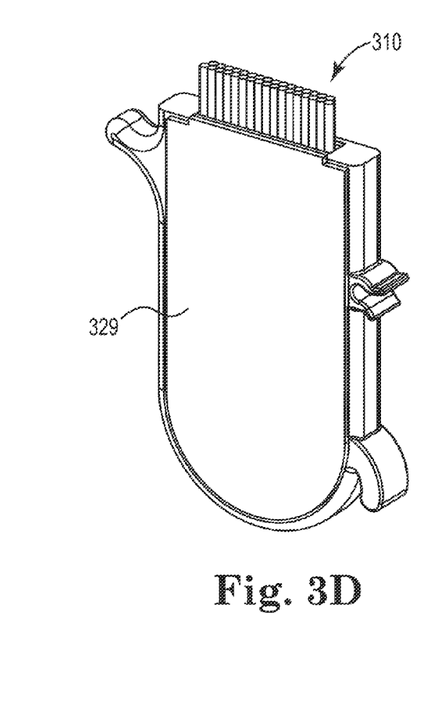

FIGS. 3A-3D are views of a splitter 310 in accordance with one or more embodiments of the present disclosure. For ease of reference, FIGS. 3A-3D will be discussed together. FIG. 3A is a front view of splitter 310, FIG. 3B is a top view of splitter 310, FIG. 3C is a side view of splitter 310, and FIG. 3D is a schematic view of splitter 310.

Splitter 310 may be fully functional and compliant in an OSP environment (e.g., +85 to −40 C operating temperature ranges) for use within cabinet 100, 200. Splitter 310 may be capable of handling a number of different fiber sizes including 1×4, 1×8, 1×16, and 1×32, among others. Splitter 310 can also accommodate multiples devices of the 1×4, 1×8, 1×16 splitter varieties, among others. Splitter 310 may be of a tool-less installation with a placement method that centers the splitter in its desired position, within a splitter cradle (e.g., having nine positions) and locks it into position with another latching feature. In some examples, splitter 310 includes ruggedized splitter legs 327 (e.g., 900 um ruggedized splitter legs) for reduced cable pile-up through the route path. The splitter legs 327 may be of a ruggedized design for an OSP environment with flexibility that may be maintained, for instance, down to −40 degrees C. The splitter legs 327 may be of a length that allows for deployment to any port with proper slack take-up through the route path. Additionally or alternatively, splitter 310 may include different size splitter legs, for instance 1.6 m and/or 2.0 m splitter legs with the same or similar requirements as the aforementioned splitter legs. Splitter 310 may be of a particular shape that meets the placement method externally and addresses proper radius protection and slack storage internally of the optical component device. Adequate room to allow for thermal expansion and contraction of splitter 310 and its legs may be considered for un-conditioned OSP environments.

A case 329 for splitter 310 may include a smaller case size as compared to other splitter cases. For instance, a width of the splitter case 329 may be smaller than widths of other splitters. This may allow for loading, sealing, and or testing of optical components at multiple locations, for instance.

The splitter case 329 may have radius protection built-in, such as, for instance, a rounded or oval case, or rounded edges inside of the case. The splitter case may allow for a particular bend radius or radiuses inside of the case, and case exits may accommodate particular sizes of splitters (e.g., a 1×32 splitter). Other options may also be accommodated (e.g., two 1×16, four 1×8, etc.).

Additionally, or alternatively, splitter case exits may accommodate a particular tubing/upjacketing size (e.g., 900 um tubing/upjacketing size). Other sizes may include, for instance 1.2 mm, 1.6 mm, and/or 2.0 mm. In a number of examples, case exits for input and output legs may be on same side, and the splitter case 329 can include a closure with snap and/or living hinge or other closure that does not require adhesives or sealant. Additionally, the closure may be tamper-proof. In some instances, the splitter case 329 may incorporate a press-in fastening/lock system allowing for tool-less install and secure fastening. In some instances, the splitter case 329 may be adaptable for use in other optical components (e.g., wavelength division multiplexing, etc.) The splitter case 329, in some examples, may be composed of a material with a particular rating, such as, for instance, a V-0 rating.

Figure 4A:
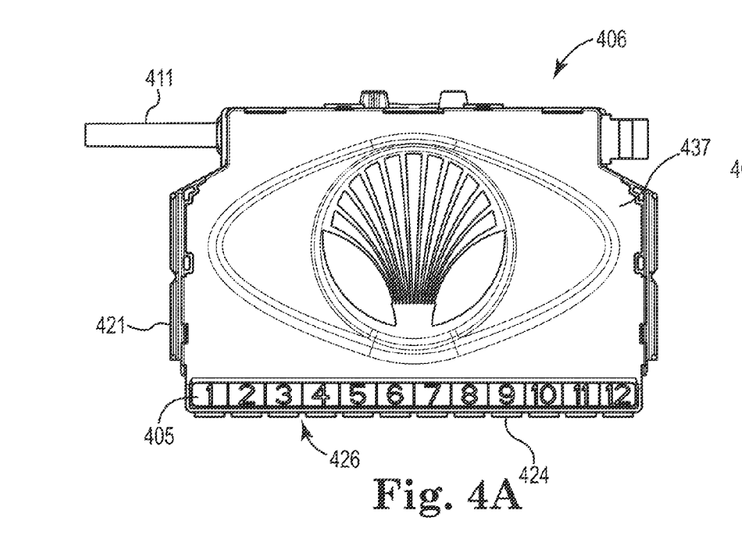
FIGS. 4A-4H are views of a fiber management device in accordance with one or more embodiments of the present disclosure.
Figure 4B:
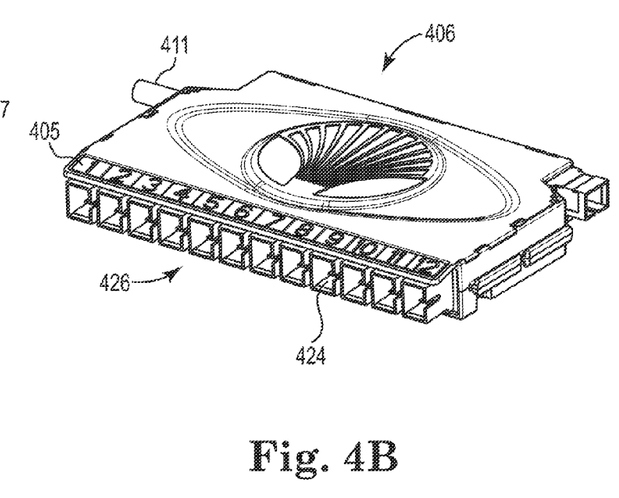
Figure 4C:
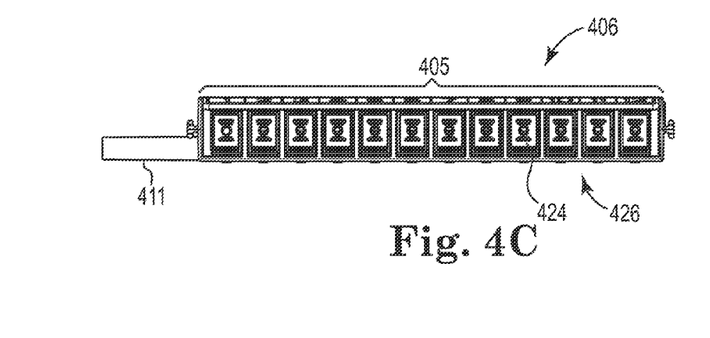
Figure 4D:
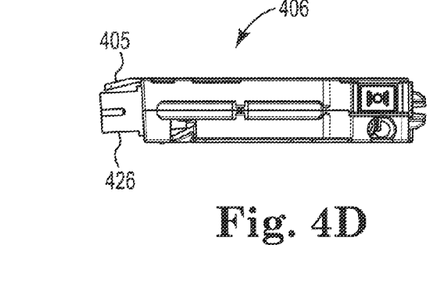
Figure 4E:
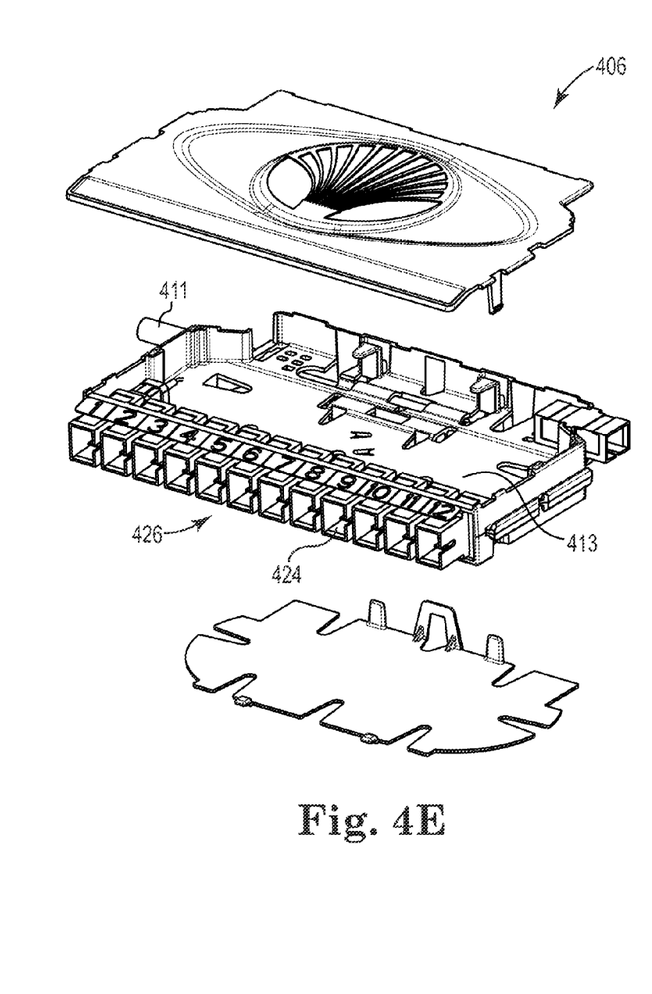
Figure 4F:
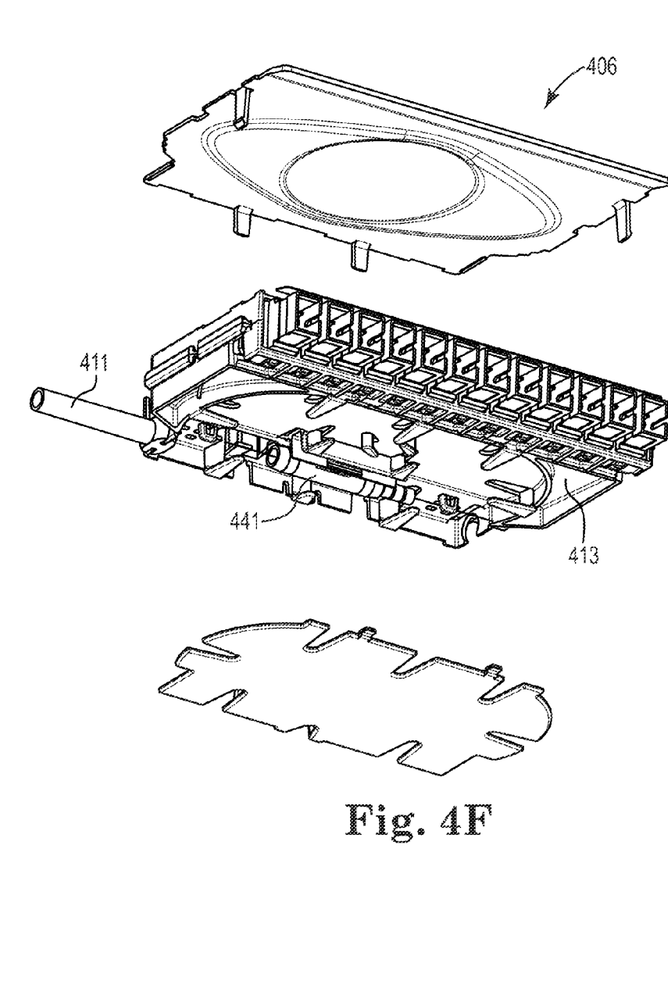
Figure 4G:
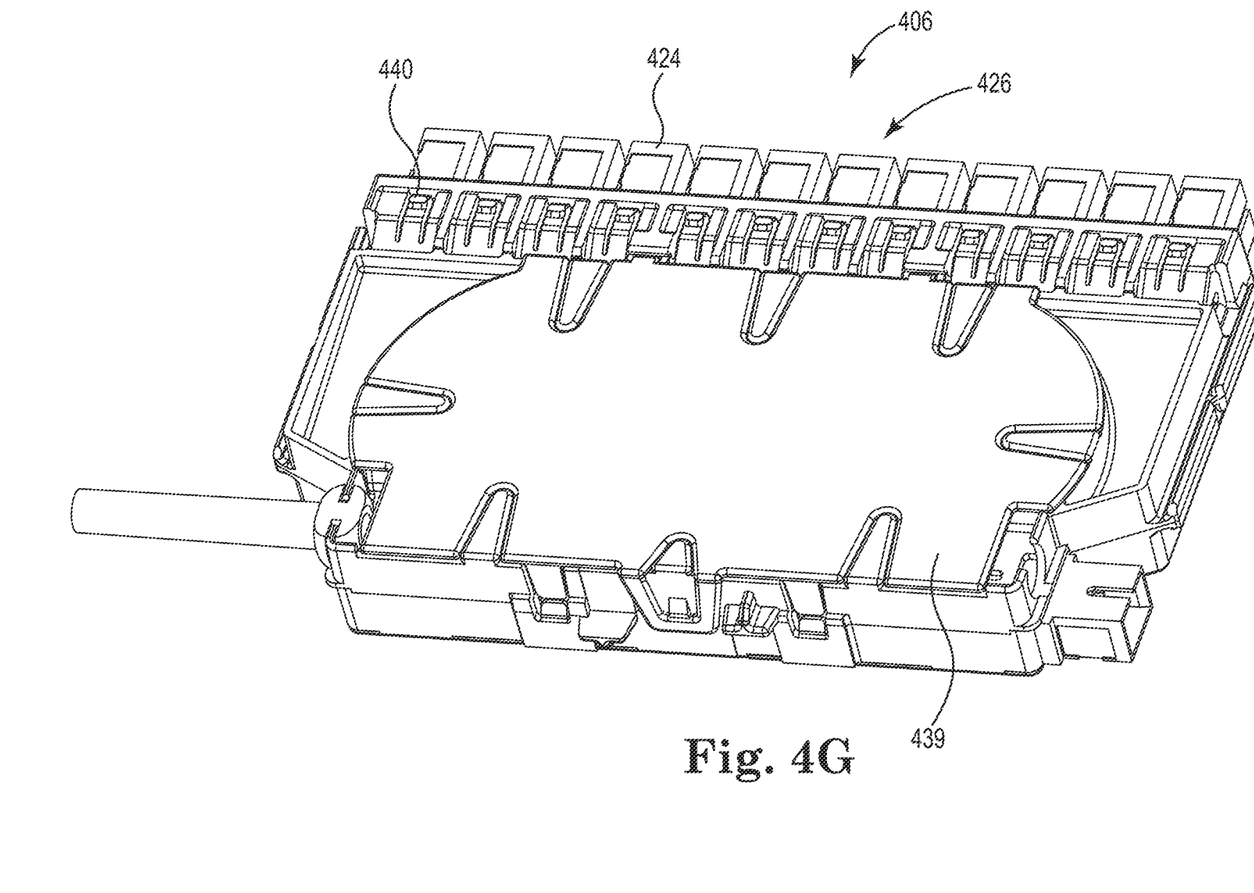
Figure 4H:
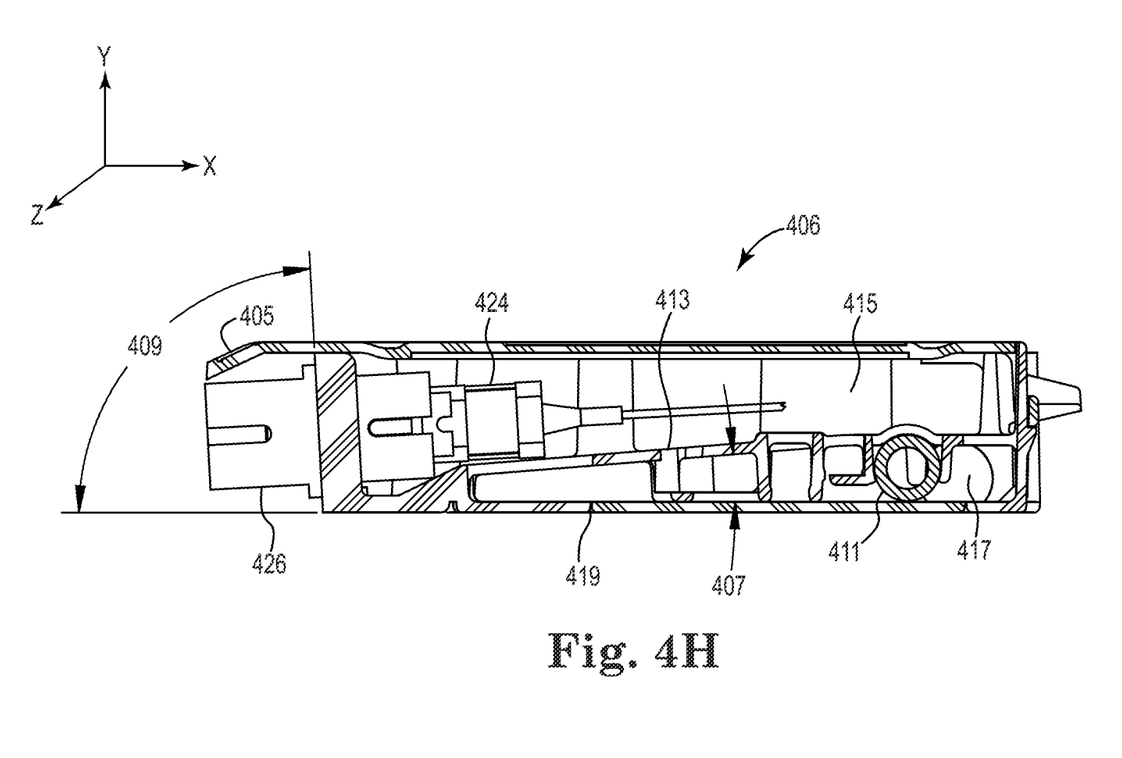

FIGS. 4A-4G are views of a fiber management cassette 406 in accordance with one or more embodiments of the present disclosure. FIG. 4A is a top view of cassette 406, FIG. 4B is a schematic top view of cassette 406, FIG. 4C is a front view of cassette 406, FIG. 4D is a side view of cassette 406, FIGS. 4E and 4F are exploded views of cassette 406, FIG. 4G is a schematic bottom view of cassette 406, and FIG. 4H is a cross-sectional view of cassette 406. For ease of reference, FIGS. 4A-4H will be discussed together.

Cassette 406 may be a one piece, two-sided fiber management device with top cover 437 and bottom cover 439. In at least one embodiment, cassette 406 includes a an integrated separation surface 413 separating an upper level of storage 415 and a lower level of storage 417 and an adapter plate 426 comprising a number of optical connectors 424 (e.g., twelve, as illustrated). The adaptor plate may be integrated into cassette 406, in some instances. The adaptor plate 426 may be angled (e.g., at angle 409) with respect to a floor 419 of the device to accommodate optical fiber management components beneath at least a portion of the number of connectors 424 while maintaining a particular radius bend limit corresponding to the optical fiber. In some instances, a depth of the cassette 406 may be such that the particular radius bend limit cannot be maintained without accommodating the optical fiber management components beneath the connectors 424. Separation surface 413 may be arranged at a particular angle 407 with respect to floor 419, and this angle may be different than angle 409. Angles 407 and 409 may allow for desired placement of connectors 424 within cassette 406, as well.

Cassette 406 may be more compact than previous cassettes, for instance, to fit within the reduced size of cabinet 100, 200. For instance, cassette 406 may be approximately 4 inches×6 inches×0.8 inches; however, cassette 406 is not limited to these dimensions. For example, other dimensions may be used that allow for cassette 406 to be used with a particular cabinet (e.g., cabinet 100, 200) and allow for a particular optical fiber radius bend limit. Cassette 406 may also, in some examples, be backwards compatible with other optical fiber management systems.

Covers 437 and 439 may be included for increased fiber protection and may be resiliently connected (e.g., releasable, removable, hinged, detachable) to cassette 406. In some instances, covers may not be removable (e.g., via a living hinge). In some examples, cassette 406 may not include covers. For instance, cassettes stacked atop one another may provide ample protection such that no cover is used. A first side of cassette 406 may be used for splicing, while the other side may be used for terminated assembly slack storage and/or may facilitate optical fiber management components including, for example, a heat shrink fusion sleeve, a snap-in feature, and/or a distribution fiber pigtail 411. In some instances, cassette 406 may include the snap-in feature 441 (e.g., tool) for transition "bullet" of the pre-terminated assembly. This is a ribbon assembly whereby the "transition" is where the assembly is transitioned from a ribbon cable to twelve discrete 900 um legs for single circuit access on the front of the cassette.

Cassette 406 may also include a transition route path from one side to the other and a locking feature on the back of the cassette that can work with swing arm detail in cabinet 100, 200 for increased in-position locking capabilities. Cassette 406 may also include tabs 421 to be received by the swinging arm to stabilize the cassette and reduce sagging, for instance. Cassette 406 can further include features for ganging multiple cassettes together, and cassette 406 can be installed without tools (e.g., tool-less installation for manufacturing or the end-user). As noted, in some examples, cassette 406 can have an angled adapter (plate) orientation on a bulkhead within cabinet 100, 200 to allow clearance for necessary optical fiber management components while maintaining a particular bend radius standard (e.g., for 900 um fiber). To accommodate a particular bend radius standard, cassette 406 may comprise a particular depth, height, and/or length. In some examples, cassette 406 can accommodate a particular bend radius standard, and up to 24 pre-terminated fibers.

Features and components of cassette 406 may be molded into the cassette, for instance, rather than being resiliently connected. Such features include, for instance, integrated splice tray functionality located on separation surface 413 and/or an integrated adaptor plate 426. In some instances, no adaptor plate 426 is included. Large slack storage may not be included because ribbon fiber is used in the cassette, reducing the need for large slack storage, in some instances. The molded/integrated components may result in less damage to cassette 406, as removal of different components may not be necessary.

Cassette 406 may include an identifier portion 405 that provides an identifier for each respective one of the number of connectors 424 (e.g., identifies port or color). Identifier portion 405 may be angled, such that identifier portion 405 is visible when cassettes are stack on top of one another. The identifiers of portion 405 (e.g., numbers 1-12 as illustrated in FIG. 4A) allow for improved (both in time and ease) identification of individual connectors.

Cassette 406 may further include adaptor removal tabs 440 (e.g., twelve illustrated in FIG. 4G). Tabs 440 can be used to remove connectors 424 for cleaning, inspection, and/or repairs, among others. This is in contrast to other devices that may include removable faceplates or adaptor plates, for instance.

With particular respect to FIG. 4H, cassette 406 includes integrated separation surface 413 separating an upper level of storage 415 and a lower level of storage 417. Cassette 406 also includes an integrated adaptor plate 426 comprising a number of optical connectors (e.g., connector 424). Adaptor plate 426 may not be removable, and may be arranged at a first angle with respect to a floor 419 of device 406. For instance, angle 409 may range from 80-90 degrees.

Separation surface 413 may be arranged at angle 407 with respect to floor 419 of the device. For instance, angle 407 may range from 0 to 6 degrees. Angles 407 and 409 accommodate optical fiber management components beneath at least a portion of the number of connectors while maintaining a particular radius bend limit corresponding to optical fiber (e.g., ribbon fiber). The optical fiber management components may include, for instance, a distribution fiber pigtail 411 and/or a heat shrink fusion sleeve, among others. In some examples, a ribbonizing tool, as will be further described herein, may be resiliently connected to cassette 406. This tool may be removed from the cassette, used in the field or elsewhere, and discarded, for example. This ribbonizing tool may be more compact in size as compared to other ribbonizing tools, and may reduce or eliminate a need for hand-ribbonizing optical fiber.

Figure 5A:
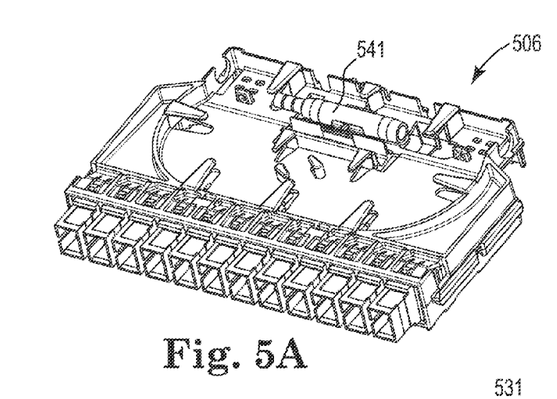
FIGS. 5A-5C are views of a fiber management device in accordance with one or more embodiments of the present disclosure.
Figure 5B:
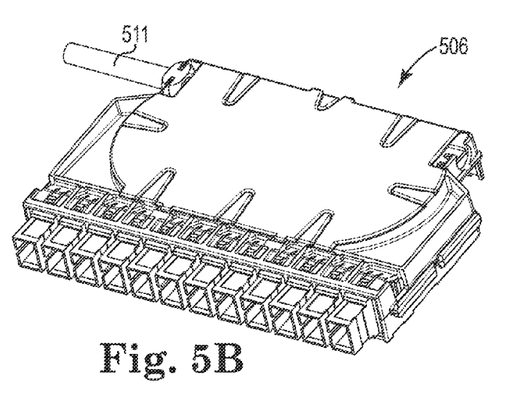
Figure 5C:
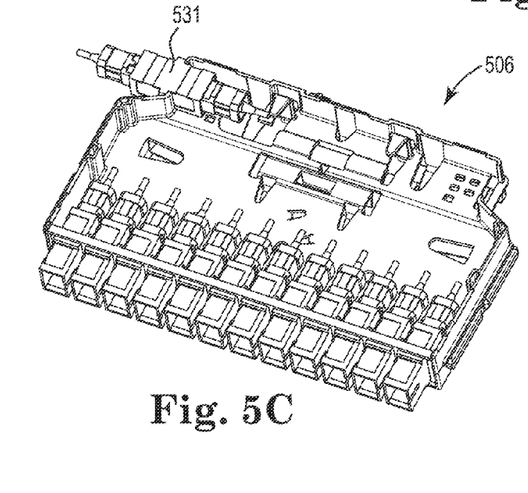

FIGS. 5A-5C are views of a fiber management cassette 506 in accordance with one or more embodiments of the present disclosure. In a number of examples, cassette 506 may be capable of adding ports via patch-only (pre-terminated tails) as illustrated in FIG. 5B (e.g., via pigtail 511) or patch-and-splice (in-cassette splicing of pre-terminated assembly to IFC or OSP multi-fiber cables) capable for ribbon-only as illustrated in FIG. 5A, using snap-in feature 541. Additionally or alternatively, cassette 506 may be capable of ribbon-only splicing for pre-terminated patch-only or patch-and-splice configurations which may require an in-the-field ribbonizing technique through the development of a disposable ribbonizing tool, as will be discussed further herein, or a jig that may be attached to each cassette 506 for one-time use. As illustrated in FIG. 5C, cassette 506 may be capable of multi-fiber plug-in connectors (MPO) plug-and-play (e.g., via connector 531).

Figure 6A:
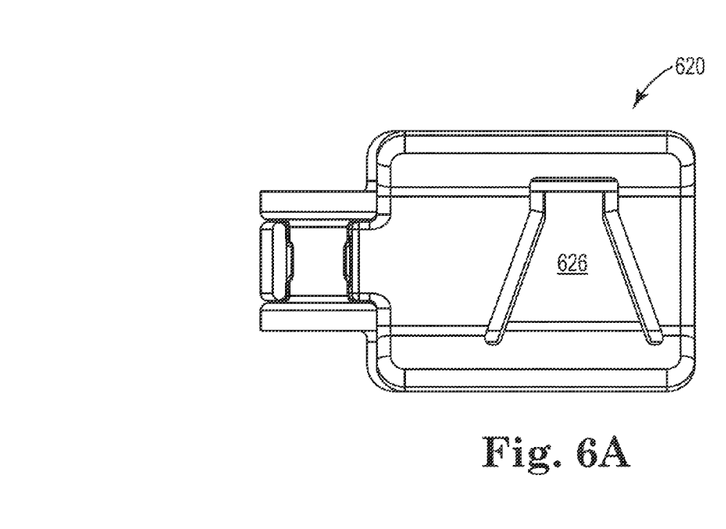
FIGS. 6A-6F are views of a ribbonizing tool in accordance with one or more embodiments of the present disclosure.
Figure 6B:
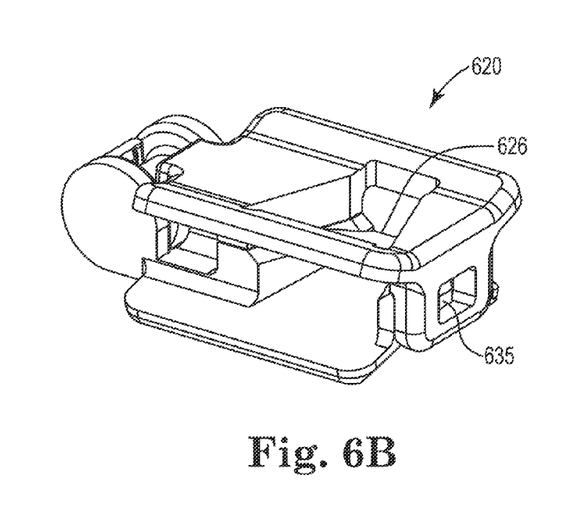
Figure 6C:
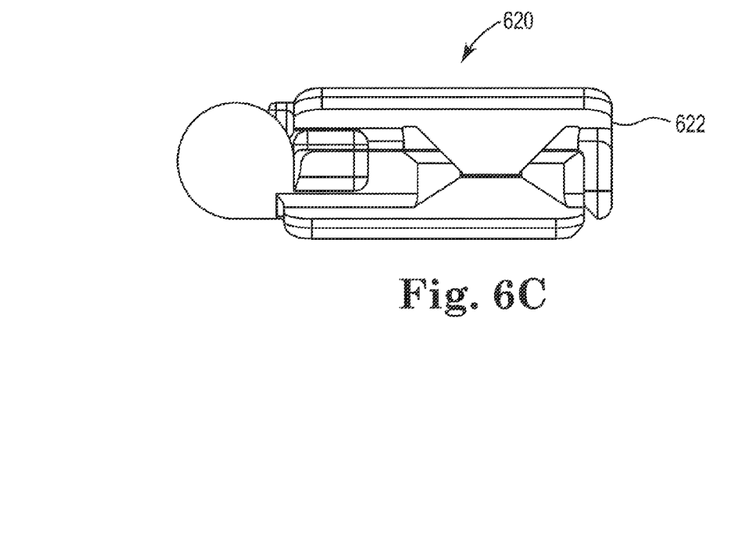
Figure 6D:
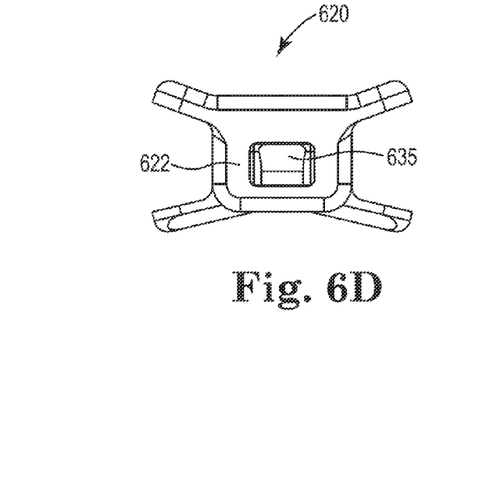
Figure 6E:
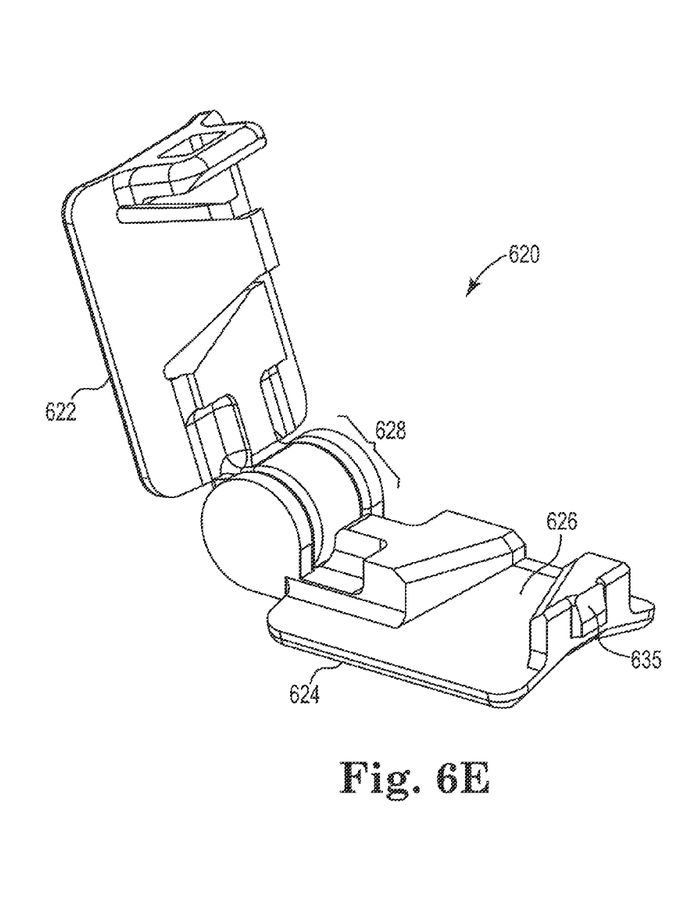
Figure 6F:
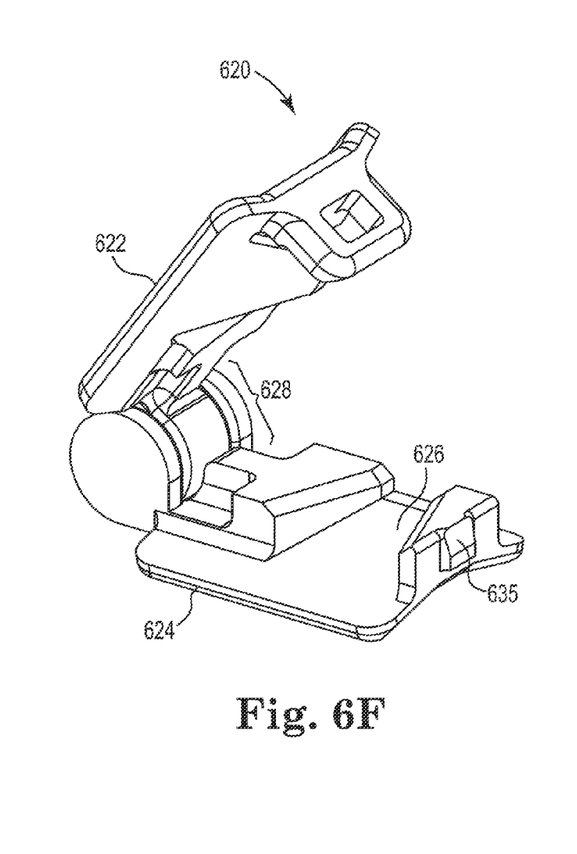

FIGS. 6A-6F are views of a ribbonizing tool 620 in accordance with one or more embodiments of the present disclosure. For ease of reference, FIGS. 6A-6F will be discussed together. FIG. 6A is a top view of tool 620, FIG. 6B is a schematic view of tool 620 when closed, FIG. 6C is a side view of tool 620, FIG. 6D is a front view of tool 620, and FIGS. 6E and 6F are schematic views of tool 620 when open.

Ribbonizing can include transforming loose optical fibers (relative to one another) into ribbonized fibers. A ribbonized format can include optical fibers positioned in a horizontal array coated (e.g., with a gel and/or acrylate coating, among others) to keep them in the horizontal array. Tool 620 can include a clam-shell design with an upper cover 622 and a lower cover 624 connected by hinge 628 whereby the user can place a number (e.g., twelve) fibers (e.g., 250 micron fibers), assuring proper color code alignment, into tool 620 and snap close the upper cover 622 over spring tab 635 securing the fibers into place. The user can take a ribbonizing coating and place an amount that fills a void 626 configured to receive the coating within the tool 620 where the fibers have been placed. The fibers can be pulled through the ribbonizing coating and through the tool 620 allowing a particular amount (e.g., a minimal amount) of coating to adhere to the fibers and secure them in a bonded ribbon (e.g., a bonded 12-fiber ribbon) on the other side. As a result, the fibers are ribbonized, including having a particular coating amount, particular alignment, and particular surface tension, among others) and ready for mass fusion splicing as per an equipment manufacturer's splicing instructions. Void 626 can improve the ease and cleanliness of the ribbonizing process, as the void 626 received the ribbonizing coating, reducing the potentially of a messy process.

As previously noted, tool 620 may be connected to the cassette (e.g., when shipped to a customer) and can be removed from an optical fiber management cassette, used in the field or elsewhere, and discarded, for example. Tool 620 may be more compact in size as compared to other ribbonizing tools, and may reduce or eliminate a need for hand-ribbonizing optical fiber. For instance, tool 620 may have dimensions of approximately 0.5 inches s 0.9 inches×0.3 inches; however, tool 620 is not limited to these dimensions. Additionally, tool 620 uses spring tab 635, which may result in increased versatility and ease of use as compared to tools that use living hinges, for example.

The present disclosure includes devices and systems for optical fiber management. One embodiment includes a device comprising a dual-sided single piece optical fiber management device. In some instances, the device has an angled orientation and wherein optical fiber within the device maintains a particular radius bend limit.

The present disclosure provides modular cassettes and methods for fiber management applications that satisfy all the basic principles of fiber management with such cassettes. Cassettes in accordance with the present disclosure comprise plural functional components that nest into a main housing portion to support various application and fiber types. In accordance with the present disclosure, such components can be added or removed depending on the application and configuration needs of the use environment. Advantageously, cassettes in accordance with the present disclosure incorporate resilient connections and nested internal components for easy assembly and disassembly with minimal fasteners and/or tools.

Furthermore, the present disclosure provides cable management cassettes and management techniques that include one or more of the following capabilities: patch only configuration; and patch and splice configuration to reduce costs without giving up convenience and/or the quality of splicing that traditional patch-only environments.

In accordance with the present disclosure, components can be added or removed depending on the application and configuration needs of the use environment. Furthermore, a number of embodiments of the present disclosure include one or more of the following capabilities: a reduced footprint to minimize space requirements and snap-together components, among others.

CONCLUSION

The present disclosure includes devices and systems for optical fiber management. One embodiment includes an optical fiber management device including an integrated separation surface separating an upper level of storage and a lower level of storage and an integrated adapter plate comprising a number of optical connectors. The integrated adapter plate may be arranged at a first angle with respect to a floor of the device to accommodate optical fiber management components beneath at least a portion of the number of connectors while maintaining a particular radius bend limit corresponding to optical fiber.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An optical fiber management device comprising:
    an integrated separation surface separating an upper level of storage and a lower level of storage; and
    an integrated adapter plate molded into the device, the integrated adapter plate comprising a number of optical connectors and arranged at a first angle with respect to a floor of the device to accommodate optical fiber management components beneath at least a portion of the number of connectors while maintaining a particular radius bend limit corresponding to optical fiber.

2. The device of claim 1, wherein the separation surface is arranged at a second angle with respect to the floor of the device and wherein the first and the second angle are different angles.

3. The device of claim 1, wherein the optical fiber includes ribbon fiber.

4. The device of claim 1, wherein the device comprises a resiliently connected cover.

5. The device of claim 1, wherein the optical fiber management components include at least one of:
 a distribution fiber pigtail; and
 a heat shrink fusion sleeve.

6. The device of claim 1, wherein the device comprises an identifier portion providing an identifier for each respective one of the number of optical connectors.

7. The device of claim 1, comprising an integrated, non-removable splice tray.

* * * * *